US012578962B2

(12) United States Patent　　(10) Patent No.:　US 12,578,962 B2

Tagata et al.　　(45) Date of Patent:　Mar. 17, 2026

(54) PROCESSOR AND METHOD OF CONTROLLING PROCESSOR

(71) Applicants:Preferred Networks, Inc., Tokyo (JP); NATIONAL UNIVERSITY CORPORATION KOBE UNIVERSITY, Hyogo (JP)

(72) Inventors: Kenji Tagata, Tokyo (JP); Harunobu Miyashita, Tokyo (JP); Junichiro Makino, Hyogo (JP)

(73) Assignees: Preferred Networks, Inc., Tokyo (JP); NATIONAL UNIVERSITY CORPORATION KOBE UNIVERSITY, Hyogo (JP)

( * ) Notice: Subject to any disclaimer, the term of this patent is extended or adjusted under 35 U.S.C. 154(b) by 92 days.

(21) Appl. No.: 18/519,635

(22) Filed: Nov. 27, 2023

(65) Prior Publication Data

US 2024/0176616 A1　　May 30, 2024

(30) Foreign Application Priority Data

Nov. 28, 2022　(JP) ................................. 2022-189518

(51) Int. Cl.
G06F 9/30　　(2018.01)
(52) U.S. Cl.
CPC ........ G06F 9/3001 (2013.01); G06F 9/30032 (2013.01)
(58) Field of Classification Search
CPC ............................ G06F 9/30032; G06F 9/3001
See application file for complete search history.

(56) References Cited

U.S. PATENT DOCUMENTS 5,968,135 A * 10/1999 Teramoto .................. G06F 9/52
709/248
6,104,731 A * 8/2000 Chow ................. G06F 9/30043
712/E9.046

OTHER PUBLICATIONS

IBM, Cell Broadband Engine Programming Tutorial, Version 2.0, Dec. 15, 2006.
Wikipedia, Cell Broadband Engine Oct. 4, 2022 version (https://ja.wikipedia.org/wiki/Cell_Broadband_Engine) Author unlisted.
Hiroo Hayashi et al., Design concept of the Cell Broadband Engine, Toshiba Review vol. 61 No. 6 (2006).
PC Watch Editorial department, University of Tokyo's 512-core processors achieve 512G FLOPS in one chip, Aug. 25, 2022 version, published on Nov. 6, 2006 (https://pc.watch.impress.co.jp/docs/2006/1106/tokyou.htm).

* cited by examiner

*Primary Examiner* — Zachary K Huson
(74) *Attorney, Agent, or Firm* — IPUSA, PLLC

(57) ABSTRACT

A processor includes an arithmetic circuit configured to execute an arithmetic instruction; and a register configured to hold data used by the arithmetic circuit. The processor receives a data movement instruction and the arithmetic instruction corresponding to the data movement instruction, and moves the data from a first memory to the register based on a data movement instruction. The arithmetic circuit executes the arithmetic instruction after a data movement of the data movement instruction is completed.

20 Claims, 6 Drawing Sheets

FIG.3

| | SINGLE DATA MOVEMENT | | MULTIPLE DATA MOVEMENT |
|---|---|---|---|
| INSTRUC-TION SEQUENCE IS1 | mv tag#01 r0 <- mem.adr0<br>wait tag#01<br>add r2 <- r0 r1<br>mult r5 <- r3 r4 | INSTRUC-TION SEQUENCE IS2 | mv tag#01 reg.adr0 <- mem.adr0 len=1024<br>wait tag#01<br>add reg.adr2 <- reg.adr0 reg.adr1<br>mult reg.adr5 <- reg.adr3 reg.adr4 |
| INSTRUC-TION SEQUENCE IS3 | mv tag#01 r0 <- sm.adr0<br>wait tag#01<br>add r2 <- r0 r1<br>mult r5 <- r3 r4 | INSTRUC-TION SEQUENCE IS4 | mv tag#01 reg.adr0 <- sm.adr0 len=1024<br>wait tag#01<br>add reg.adr2 <- reg.adr0 reg.adr1<br>mult reg.adr5 <- reg.adr3 reg.adr4 |
| INSTRUC-TION SEQUENCE IS5 | mv tag#01 sm.adr0 <- r2<br>wait tag#01<br>add r2 <- r0 r1<br>mult r5 <- r3 r4 | INSTRUC-TION SEQUENCE IS6 | mv tag#01 sm.adr0 <- reg.adr2 len=1024<br>wait tag#01<br>add reg.adr2 <- reg.adr0 reg.adr1<br>mult reg.adr5 <- reg.adr3 reg.adr4 |

FIG.4

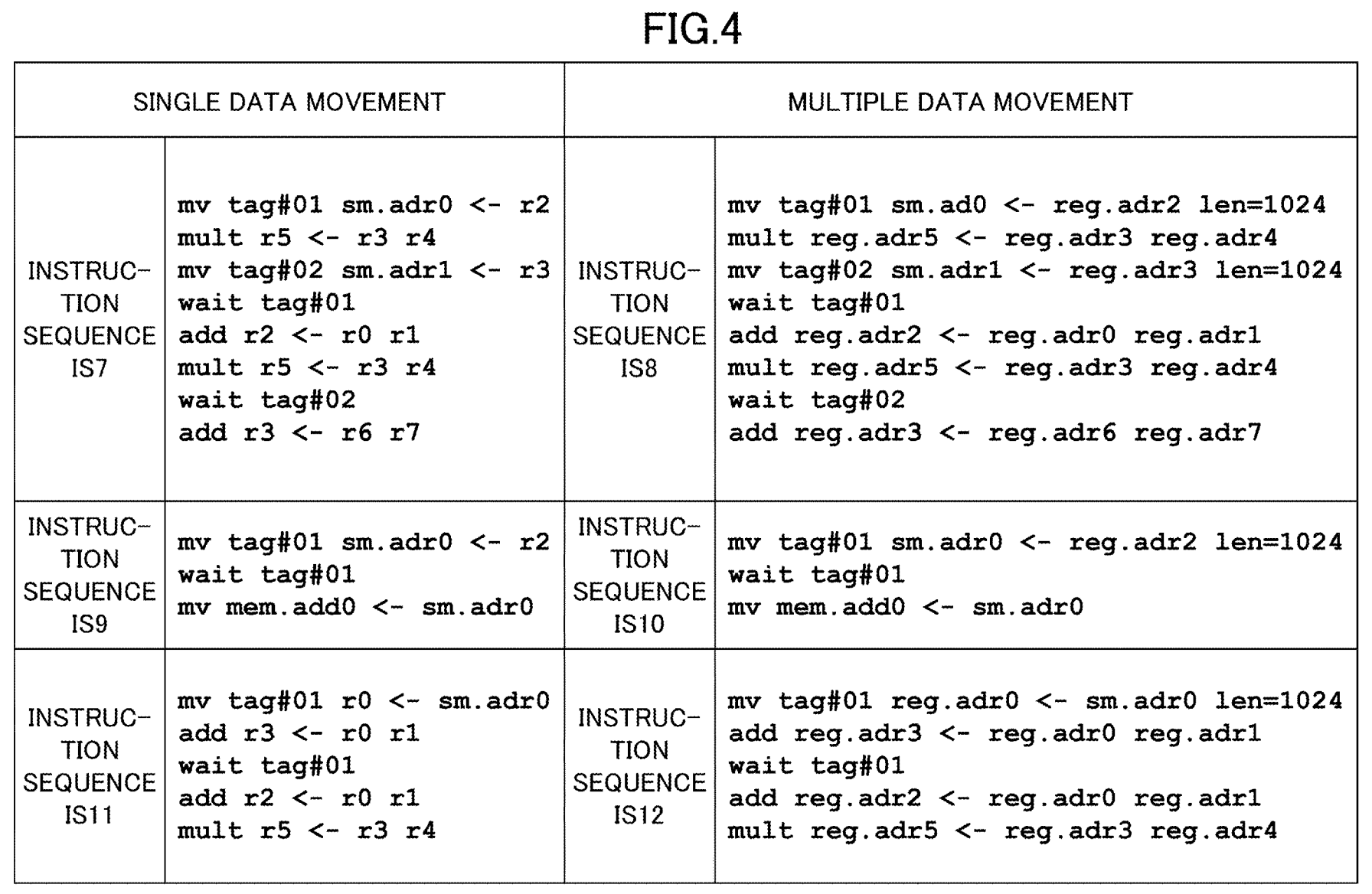

| SINGLE DATA MOVEMENT | MULTIPLE DATA MOVEMENT |
|---|---|
| INSTRUCTION SEQUENCE IS7<br>```mv tag#01 sm.adr0 <- r2```<br>```mult r5 <- r3 r4```<br>```mv tag#02 sm.adr1 <- r3```<br>```wait tag#01```<br>```add r2 <- r0 r1```<br>```mult r5 <- r3 r4```<br>```wait tag#02```<br>```add r3 <- r6 r7``` | INSTRUCTION SEQUENCE IS8<br>```mv tag#01 sm.ad0 <- reg.adr2 len=1024```<br>```mult reg.adr5 <- reg.adr3 reg.adr4```<br>```mv tag#02 sm.adr1 <- reg.adr3 len=1024```<br>```wait tag#01```<br>```add reg.adr2 <- reg.adr0 reg.adr1```<br>```mult reg.adr5 <- reg.adr3 reg.adr4```<br>```wait tag#02```<br>```add reg.adr3 <- reg.adr6 reg.adr7``` |
| INSTRUCTION SEQUENCE IS9<br>```mv tag#01 sm.adr0 <- r2```<br>```wait tag#01```<br>```mv mem.add0 <- sm.adr0``` | INSTRUCTION SEQUENCE IS10<br>```mv tag#01 sm.adr0 <- reg.adr2 len=1024```<br>```wait tag#01```<br>```mv mem.add0 <- sm.adr0``` |
| INSTRUCTION SEQUENCE IS11<br>```mv tag#01 r0 <- sm.adr0```<br>```add r3 <- r0 r1```<br>```wait tag#01```<br>```add r2 <- r0 r1```<br>```mult r5 <- r3 r4``` | INSTRUCTION SEQUENCE IS12<br>```mv tag#01 reg.adr0 <- sm.adr0 len=1024```<br>```add reg.adr3 <- reg.adr0 reg.adr1```<br>```wait tag#01```<br>```add reg.adr2 <- reg.adr0 reg.adr1```<br>```mult reg.adr5 <- reg.adr3 reg.adr4``` |

FIG.5

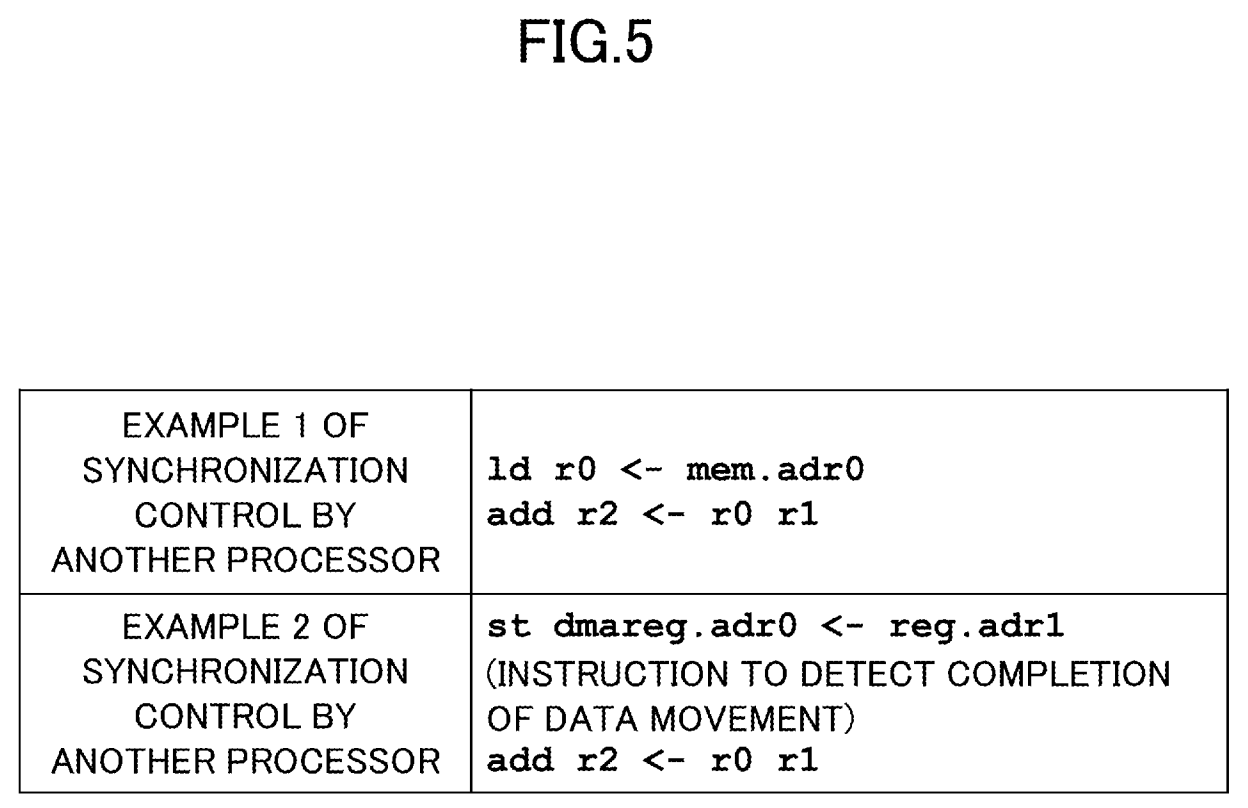

| EXAMPLE 1 OF SYNCHRONIZATION CONTROL BY ANOTHER PROCESSOR | ld r0 <- mem.adr0<br>add r2 <- r0 r1 |
| EXAMPLE 2 OF SYNCHRONIZATION CONTROL BY ANOTHER PROCESSOR | st dmareg.adr0 <- reg.adr1<br>(INSTRUCTION TO DETECT COMPLETION OF DATA MOVEMENT)<br>add r2 <- r0 r1 |

PROCESSOR AND METHOD OF CONTROLLING PROCESSOR

CROSS-REFERENCE TO RELATED APPLICATIONS

This patent application is based on and claims priority to Japanese Patent Application No. 2022-189518 filed on Nov. 28, 2022, the entire contents of which are incorporated herein by reference.

TECHNICAL FIELD

The present disclosure relates to a processor and a method of controlling the processor.

BACKGROUND

A processor stores data read from a memory in a register based on a data movement instruction, such as a load instruction, for example. The processor executes an operation based on an arithmetic instruction by using the data stored in the register and stores an operation result in the register. When the operation result is held or used by another processor or a core of another processor, the operation result is saved from the register to a memory or the like by the data movement instruction.

When data held in a memory having a constant access latency is read to a register to execute an operation, the number of cycles required from an issue of the data movement instruction to an issue of the arithmetic instruction is constant. Therefore, a compiler that compiles instructions can generate an instruction sequence in which the data movement instruction and the arithmetic instruction can be synchronized with each other.

With respect to the above, when data held in a memory having an inconstant access latency is read to a register and an operation is executed, the number of cycles required from an issue of the data movement instruction to an issue of the arithmetic instruction may be different for each issue of the data movement instruction. In this case, a compiler cannot generate an instruction sequence in which the data movement instruction and the arithmetic instruction can be synchronized with each other.

For example, by describing an instruction for activating a direct memory access (DMA) function to move data and an instruction to detect completion of the data movement in an instruction sequence together with the arithmetic instruction, a core that executes the instructions can synchronize the movement of the data with the execution of the operation. However, when the synchronization is achieved by the instruction executed by the core, the processing performance of the operation decreases.

SUMMARY

According to an embodiment of the present disclosure, a processor includes an arithmetic circuit configured to execute an arithmetic instruction; and a register configured to hold data used by the arithmetic circuit. The processor receives a data movement instruction and the arithmetic instruction corresponding to the data movement instruction, and moves the data from a first memory to the register based on a data movement instruction. The arithmetic circuit executes the arithmetic instruction after a data movement of the data movement instruction is completed.

BRIEF DESCRIPTION OF THE DRAWINGS

FIG. 3 is a drawing illustrating an example of an instruction sequence executed by the processor of FIG. 1;

FIG. 4 is a drawing illustrating another example of the instruction sequence executed by the processor of FIG. 1;

FIG. 5 is a drawing illustrating an example of synchronization control of a data movement instruction and an arithmetic instruction by other processors.

DETAILED DESCRIPTION OF EMBODIMENTS

In the following, embodiments of the present disclosure will be described in detail with reference to the drawings. Although not particularly limited, a processor described below is mounted on a computer, such as a server, and executes a program (instructions) to execute a convolution operation or the like in training or inference of a deep neural network. Here, the processor described below may be used for scientific calculation or the like.

Figure 1:
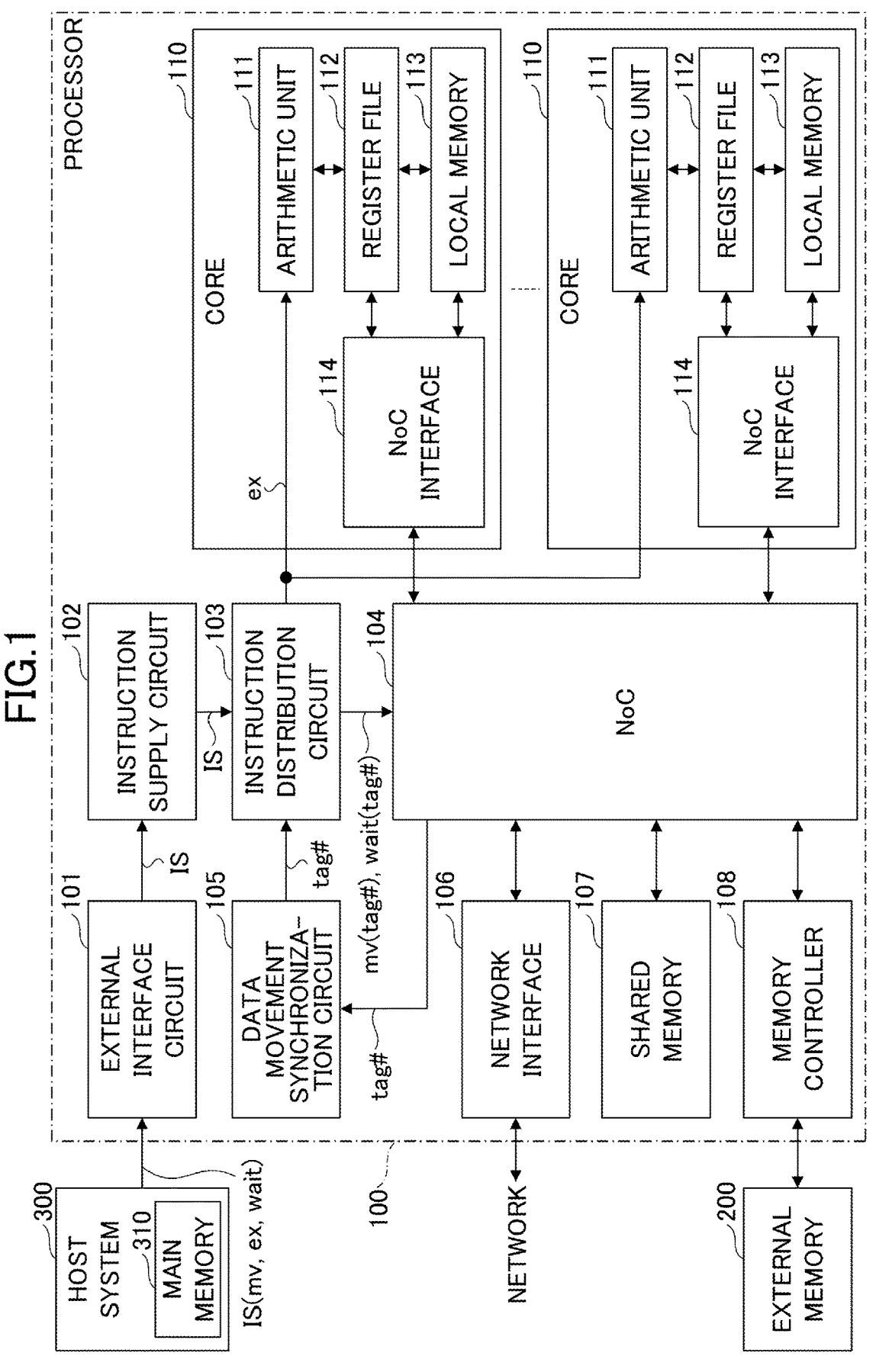
FIG. 1 is a block diagram illustrating an example of a configuration of a processor according to an embodiment of the present disclosure.

FIG. 1 is a block diagram illustrating an example of a configuration of a processor according to an embodiment of the present disclosure. A processor 100 illustrated in FIG. 1 may be mounted on a board of a server or the like, which is not illustrated, together with an external memory 200. The external memory 200 is an example of a first memory having an inconstant access latency. Multiple processors 100 may be mounted on the board. In this case, the external memory 200 may be provided for each of the multiple processors 100 or may be provided in common to the multiple processors 100. The processor 100 is connected to a host system 300 via a board.

The processor 100 may be, for example, a single instruction multiple data (SIMD) type processor or a single instruction multiple threads (SIMT) type processor. The processor 100 includes an external interface circuit 101, an instruction supply circuit 102, an instruction distribution circuit 103, a network on chip (NoC) 104, a data movement synchronization circuit 105, a network interface 106, a shared memory 107, a memory controller 108, and multiple cores 110. Each core 110 may include an arithmetic unit 111 (i.e., an arithmetic circuit), a register file 112, a local memory 113, and an NoC interface 114.

The external interface circuit 101 may be connected to the host system 300 via, for example, a peripheral component interconnect express (PCIe) bus or the like and may control communication with the host system 300. The external interface circuit 101 may output an instruction sequence IS supplied from the host system 300 to the instruction supply circuit 102.

The instruction supply circuit 102 may read the instruction sequence IS held in a main memory 310 of the host system 300 via the external interface circuit 101, and may supply the read instruction sequence IS to the instruction distribution circuit 103. For example, the instruction sequence IS includes a data movement instruction mv, an arithmetic instruction ex, such as an addition instruction or a multiplication instruction, and a wait instruction wait to be described later.

The instruction distribution circuit 103 may divide the instructions included in the instruction sequence IS received from the instruction supply circuit 102 into the data movement instruction mv, the wait instruction wait, and the arithmetic instruction ex. The instruction distribution circuit 103 may supply the data movement instruction my and the wait instruction wait including a tag "tag#", which is identification information, to the NoC 104. The instruction distribution circuit 103 may prevent the arithmetic instruction ex received from the instruction supply circuit 102 from being issued to the arithmetic unit 111 until permission is received from the data movement synchronization circuit 105.

As will be described later, the data movement instruction my and the arithmetic instruction ex may be associated with each other by the tag "tag#". By using the tag "tag#", as described in FIG. 3 and FIG. 4, even when multiple data movement instructions my are mixed, the movement of the data based on the data movement instruction my can be synchronized with an operation executed in response to the movement of the data.

For example, after supplying the data movement instruction my to the NoC 104, the instruction distribution circuit 103 inhibits supply of the arithmetic instruction ex corresponding to the supplied data movement instruction my to the arithmetic unit 111 until the tag "tag#" corresponding to the data movement instruction my is received from the data movement synchronization circuit 105.

The NoC 104 may move the data between the shared memory 107, the external memory 200 or the network, and the local memory 113 or the register file 112, based on the data movement instruction my received from the instruction distribution circuit 103. As described, the data movement instruction my may be executed without the intervention of the core 110. The NoC 104 is an example of a data movement control circuit.

For each data movement instruction mv, when the movement of the data based on the data movement instruction my is completed, the NoC 104 may output the tag "tag#" corresponding to the data movement instruction my to the data movement synchronization circuit 105. The tag "tag#" output from the NoC 104 to the data movement synchronization circuit 105 is an example of completion information indicating that the movement of the data is completed. Here, the NoC 104 may output a data movement completion notification including the tag "tag#" to the data movement synchronization circuit 105 based on the completion of the data movement.

The data movement synchronization circuit 105 may prevent the tag "tag#" corresponding to the data movement instruction my from being output to the instruction distribution circuit 103 until the tag "tag#" is received from the NoC 104. When receiving the tag "tag#" from the NoC 104, the data movement synchronization circuit 105 may output the received tag "tag#" to the instruction distribution circuit 103.

The tag "tag#" output from the data movement synchronization circuit 105 to the instruction distribution circuit 103 is an example of permission information for permitting an issue of the arithmetic instruction ex corresponding to the tag "tag#" to the arithmetic unit 111. Here, the data movement synchronization circuit 105 may output an instruction to start an operation including the tag "tag#" to the instruction distribution circuit 103 based on the tag "tag#" received from the NoC 104.

The instruction distribution circuit 103 may simultaneously issue the arithmetic instruction ex corresponding to the tag "tag#" to multiple cores 110 based on the reception of the tag "tag#" from the data movement synchronization circuit 105. For example, the instruction distribution circuit 103 determines that the arithmetic instruction ex following the wait instruction wait, to which the tag "tag#" is added, is the arithmetic instruction ex corresponding to the tag "tag#". The arithmetic units 111 of the multiple cores 110 may execute the received arithmetic instruction ex in parallel. With this, for example, the SIMD arithmetic operation may be executed using the multiple arithmetic units 111. As described, the processor 100 can synchronize the movement of the data by the data movement instruction my and the execution of the arithmetic instruction ex without using the core 110. Additionally, the instruction distribution circuit 103 may have a mode in which the arithmetic instructions ex corresponding to the tag "tag#" are simultaneously issued to one core 110 based on the reception of the tag "tag#" from the data movement synchronization circuit 105. Here, the function of the data movement synchronization circuit 105 may be provided in the instruction distribution circuit 103, the data movement synchronization circuit 105 may be removed from the processor 100, and the tag "tag#" may be directly output from the NoC 104 to the instruction distribution circuit 103.

The network interface 106 may connect the processor 100 to a network. When a source address or a destination address included in the data movement instruction my indicates a storage area of a memory arranged in the network, which is not illustrated, the NoC 104 may output a memory access request to the network via the network interface 106. The access of the memory connected to the network via the network interface 106 does not take a fixed number of cycles, and the memory access time is not constant. Therefore, the NoC 104 cannot predict when a response to a memory access request issued to the network interface 106 is returned.

The shared memory 107 is, for example, a static random access memory (SRAM), and can hold data used by the arithmetic unit 111, an operation result of the arithmetic unit 111, and the like. Here, the access latency (read latency and write latency) of the shared memory 107 is constant (a fixed number of cycles). When accessing the shared memory 107, the NoC 104 may output a memory access request to the shared memory 107. The shared memory 107 is an example of a second memory.

The read latency of the shared memory 107 is the number of cycles required from when the NoC 104 outputs a read access command to the shared memory 107 to when the NoC 104 receives data corresponding to the read access command from the shared memory 107. The write latency of the shared memory 107 is the number of cycles required from when the NoC 104 outputs a write access command to the shared memory 107 to when data corresponding to the write access command is written to the shared memory 107.

Here, although the access latency of the shared memory 107 is constant, for example, when NoC 104 performs processing of accessing the external memory 200 in the background, the memory access of the shared memory 107 may be made to wait. Thus, when executing the data movement instruction my for accessing the shared memory 107, the processor 100 may perform synchronization control between the data movement instruction my and the arithmetic instruction ex by using the tag "tag#".

The memory controller 108 may control access of the external memory 200. Although not particularly limited, for example, the external memory 200 may be a dynamic random access memory (DRAM). Here, the external memory 200 may be an electrically rewritable nonvolatile memory, such as a flash memory, or may be a storage device that stores data by using magnetism or a resistance value.

For example, the memory controller 108 includes a queue that holds the memory access requests received from the NoC 104, and sequentially issues the memory access requests held in the queue to the external memory 200. Thus, the time (the memory access time) from when the NoC 104 outputs the memory access request to when the NoC 104 receives data corresponding to the memory access request from the memory controller 108 is not constant.

The following description assumes that the read latency of the external memory 200 is the number of cycles required from when the NoC 104 outputs a read access request to the memory controller 108 to when the NoC 104 receives data corresponding to the read access request from the memory controller 108. The write latency of the external memory 200 is the number of cycles required from when the NoC 104 outputs a write access request to the memory controller 108 to when data corresponding to the write access request is written to the external memory 200.

Each of the arithmetic units 111 of the multiple cores 110 may read operation target data from the register file 112 according to the arithmetic instruction ex supplied from the instruction distribution circuit 103. Each arithmetic unit 111 may perform an operation by using the read data and store operation result data in the register file 112. Although not particularly limited, the arithmetic unit 111 includes, for example, one or both of an arithmetic logic unit (ALU) and a floating point unit (FPU). Additionally, the arithmetic unit 111 may include multiple types of arithmetic circuits, such as an adder and a multiplier.

The register file 112 may include multiple registers used by the arithmetic unit 111. A register number or address may be assigned to each of the multiple registers, and each register may be identified by the register number or address.

The local memory 113 is, for example, a static random access memory (SRAM) data, and can hold the data used by the arithmetic unit 111, an operation result of the arithmetic unit 111, and the like via the register file 112. The access latency of the local memory 113 is constant (a fixed number of cycles), and the memory access time is constant.

The NoC interface 114 may control data movement between the register file 112 or the local memory 113 and the NoC 104.

Figure 2:
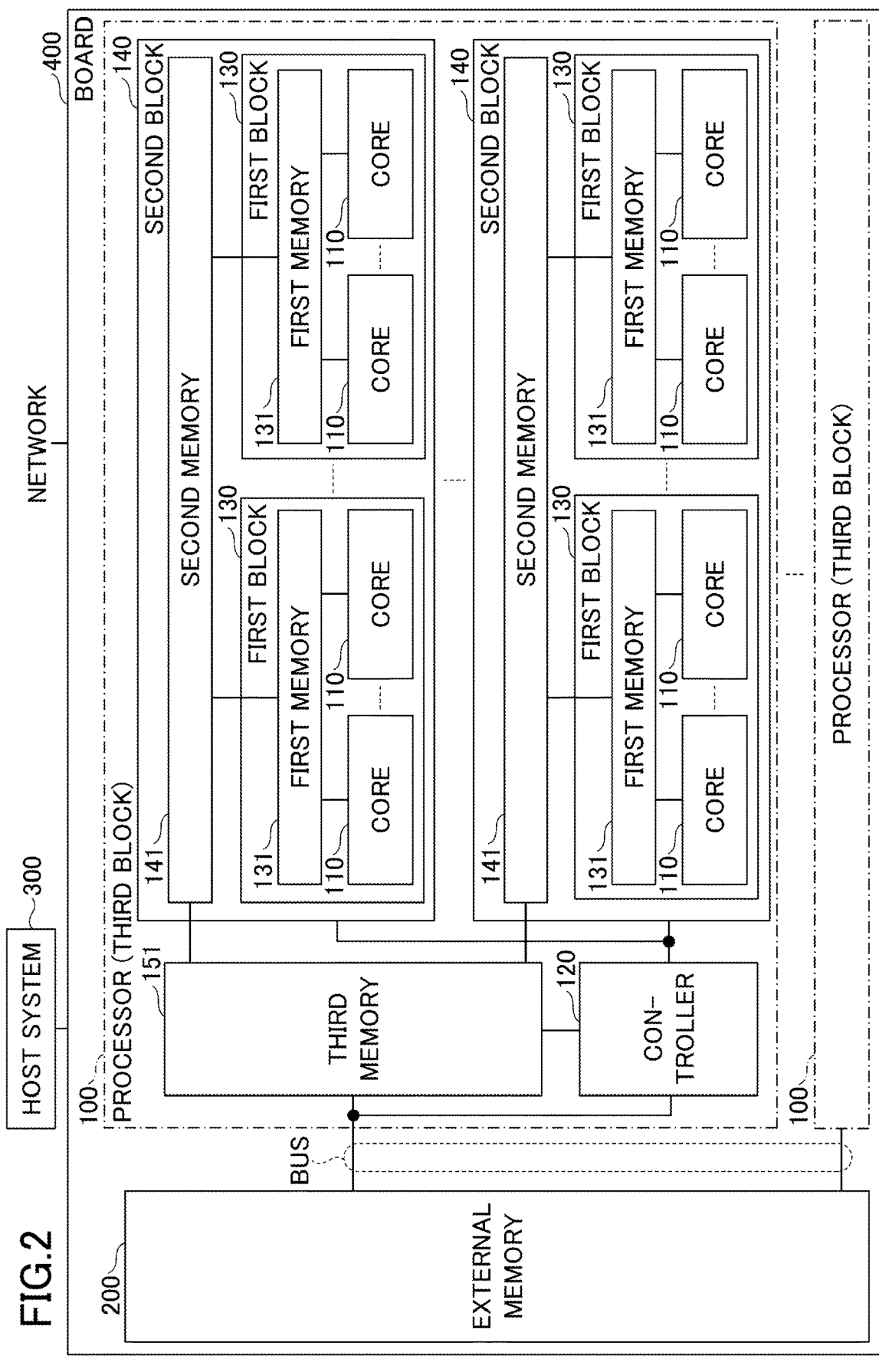
FIG. 2 is a block diagram illustrating an example of a board on which the processor and the external memory of FIG. 1 are mounted.

FIG. 2 is a block diagram illustrating an example of a board on which the processor 100 and the external memory 200 of FIG. 1 are mounted. The processor 100 and the external memory 200 of FIG. 1 may be mounted on a board 400 illustrated in FIG. 2. Here, multiple boards 400 may be mounted on a computer, such as a server, and multiple cores 110 of multiple processors 100 mounted on the multiple boards 400 may commonly execute one data movement instruction and commonly execute one arithmetic instruction.

The processor 100 may include a controller 120, multiple second blocks 140, and a third memory 151 commonly connected to the multiple second blocks 140. The controller 120 may be provided in common to the multiple second blocks 140 to control the entire processor 100.

The controller 120 may include the external interface circuit 101, the instruction supply circuit 102, the instruction distribution circuit 103, the NoC 104, the data movement synchronization circuit 105, the network interface 106, and the memory controller 108 of FIG. 1. For example, the host system 300 may store an instruction sequence and data used to execute the instruction in the external memory 200, or may acquire an operation result generated by each core 110 from the external memory 200.

The third memory 151 may be connected to the external memory 200 via a bus BUS. Each second block 140 may include multiple first blocks 130 and a second memory 141 connected in common to the multiple first blocks 130. Each first block 130 may include multiple cores 110 and a first memory 131 commonly connected to the multiple cores 110. As described above, the processor 100 may include the third memory 151, the second memory 141, and the first memory 131 that are layered between the external memory 200 and the core 110. Here, the third memory 151, the second memory 141, and the first memory 131 may be used as the shared memory 107 in FIG. 1.

FIG. 3 and FIG. 4 are diagrams illustrating examples of the instruction sequence IS executed by the processor 100 illustrated in FIG. 1. The instruction sequence IS illustrated in each of FIG. 3 and FIG. 4 may be generated in advance by a compiler or the like and then stored in the main memory 310 of the host system 300. Then, the instruction supply circuit 102 may read the instruction sequence IS from the main memory 310, and the instructions included in the instruction sequence IS may be sequentially processed by supplying the read instruction sequence IS to the instruction distribution circuit 103. The control method of the processor 100 may be achieved by sequentially processing the instructions included in the instruction sequence IS.

In the examples illustrated in FIG. 3 and FIG. 4, the data movement instruction my to move single data and the data movement instruction my to move multiple data having consecutive addresses in a storage area are illustrated. Although not particularly limited, for example, the single data is 4 bytes, 8 bytes, or the like and corresponds to the size of each register of the register file 112.

In the instructions included in the instruction sequence IS, a symbol my indicates the data movement instruction mv, and a symbol wait indicates the wait instruction to wait for the completion of the data movement instruction mv. A symbol add indicates the addition instruction and a symbol mult indicates the multiplication instruction. The symbol ← indicates that data or an operation result moves from a right element to a left element. Here, although FIG. 3 and FIG. 4 illustrate examples in which the addition instruction add and the multiplication instruction mult are executed as the arithmetic instruction ex, the subtraction instruction and the division instruction may be executed as another arithmetic instruction ex.

A symbol adr indicates an address, a symbol r indicates a register of the register file 112, and a symbol reg indicates the register file 112. For example, the size of each register r is 4 bytes, 8 bytes, or the like. A symbol mem indicates the external memory 200, and a symbol sm indicates the shared memory 107. A symbol lm indicates the local memory 113. A symbol len is movement amount information indicating a movement amount (for example, the number of bytes) of data.

In an instruction sequence IS1, the addition instruction add is executed using data moved from the external memory 200 to a register r0. In the instruction sequence IS1, first, the data movement instruction my and the wait instruction wait to which the tag "tag#"=01 is assigned, and the addition instruction add, and the multiplication instruction mult may be sequentially supplied from the instruction supply circuit 102 to the instruction distribution circuit 103.

That is, the data movement instruction my and the arithmetic instruction ex that uses the data moved by the data movement instruction my are described such that the wait instruction wait is between the data movement instruction my and the arithmetic instruction ex. Alternatively, as illustrated in an instruction sequence IS5, which will be described later, the data movement instruction my and the arithmetic instruction ex that uses a register in which data is saved by the data movement instruction my are described such that the wait instruction wait is between the data movement instruction my and the arithmetic instruction ex. The data movement instruction my and the arithmetic instruction ex corresponding to the data movement instruction my are similarly described in other instruction sequences illustrated in FIG. 3 and FIG. 4 such that the wait instruction wait is between the data movement instruction my and the arithmetic instruction ex.

The instruction distribution circuit 103 may supply the data move instruction my and the wait instruction wait to the NoC 104. The instruction distribution circuit 103 may handle the addition instruction add and the multiplication instruction mult received subsequent to the wait instruction wait as the arithmetic instructions corresponding to the tag "tag#"=01. At this time, because the instruction distribution circuit 103 does not receive the tag "tag#"=01 from the data movement synchronization circuit 105, the instruction distribution circuit 103 prevents the addition instruction add and the multiplication instruction mult from being issued to the arithmetic unit 111.

The NoC 104 may execute the data movement instruction my and start a memory access to move data from a storage area to which an address adr0 is assigned in the external memory 200 to the register r0. Additionally, because the NoC 104 receives the wait instruction wait (tag#=01), the NoC 104 need not output the tag "tag#"=01 to the data movement synchronization circuit 105 until the execution of the data movement instruction my to which the tag "tag#"=01 is assigned is completed.

Subsequently, the NoC 104 may complete the movement of the data by storing the data read from the external memory 200 in the register r0 via the NoC interface 114. The NoC 104 may output the tag "tag#"=01 to the data movement synchronization circuit 105 based on the completion of the movement of the data. The data movement synchronization circuit 105 may output the received tag "tag#"=01 to the instruction distribution circuit 103.

The instruction distribution circuit 103 may search for the wait instruction wait (tag#01) corresponding to the received tag "tag#"=01, and may sequentially issue the addition instruction add and the multiplication instruction mult following the searched wait instruction wait (tag#01) to the arithmetic unit 111.

For example, the instruction distribution circuit 103 issues one arithmetic instruction ex following the wait instruction wait or sequentially issues multiple consecutive arithmetic instructions ex following the wait instruction wait to the arithmetic unit 111. In other words, the instruction distribution circuit 103 may issue the arithmetic instruction ex between the wait instruction wait and the next data movement instruction my or the arithmetic instruction ex between the wait instruction wait and the next wait instruction wait to the arithmetic unit 111. Then, the addition instruction add may be executed using the data moved from the external memory 200 to the register r0, and subsequently the multiplication instruction mult may be executed.

In the addition instruction add of the instruction sequence IS1, the data held in the register r0 and data held in a register r1 may be added, and a result of the addition may be stored in a register r2. In the multiplication instruction mult of the instruction sequence IS1, data held in a register r3 may be multiplied by data held in a register r4, and a result of the multiplication may be stored in a register r5.

In the instruction sequence IS1, after the data movement synchronization circuit 105 waits for the completion of the movement of the data by using the wait instruction wait, the addition instruction add can be executed by using the data moved to the register r0. Thus, even when the addition instruction add is executed by using the data read from the external memory 200 having inconstant read latency, false operations of the processor 100 can be prevented.

In the instruction sequence IS2, the addition instruction add may be executed by using multiple data moved from the external memory 200 to the register file 112. Detailed description of the same processing as that of the instruction sequence IS1 is omitted. Here, although an example in which data of 1024 bytes is moved is illustrated in the instruction sequences IS2, IS4, IS6, IS8, IS10, and IS12, the amount of moved data is not limited to 1024 bytes.

In the instruction sequence IS2, the data movement instruction my (tag#=01) to sequentially move the data of 1024 bytes starting from a storage area of the external memory 200, to which the address adr0 is assigned, to a register of the register file 112, to which the address adr0 is assigned, is supplied from the instruction supply circuit 102 to the instruction distribution circuit 103. Subsequently, the wait instruction wait (tag#=01), the addition instruction add, and the multiplication instruction mult may be sequentially supplied from the instruction supply circuit 102 to the instruction distribution circuit 103.

As in the instruction sequence IS1, the instruction distribution circuit 103 may supply the data movement instruction my and the wait instruction wait to the NoC 104 and need not issue the addition instruction add and the multiplication instruction mult instruction to the arithmetic unit 111 until the tag "tag#"=01 is received from the data movement synchronization circuit 105.

The NoC 104 may execute the data movement instruction my and start a memory access to read the data of 1024 bytes from the address adr0 of the external memory 200. The NoC 104 may output the tag "tag#"=01 to the data movement synchronization circuit 105 based on the completion of the movement of the data to the register by the data movement instruction my to which the tag "tag#"=01 is assigned.

When receiving the tag "tag#"=01, the data movement synchronization circuit 105 may output the received tag "tag#"=01 to the instruction distribution circuit 103. The instruction distribution circuit 103 may search for the wait instruction wait (tag#01) corresponding to the received tag "tag#"=01, and sequentially issue the addition instruction add and the multiplication instruction mult following the searched wait instruction wait (tag#01) to the arithmetic unit 111. Then, the addition instruction add may be executed using the data of 1024 bytes moved from the external memory 200 to the register r0, and subsequently the multiplication instruction mult may be executed.

In the add instruction add of the instruction sequence IS2, the data of 1024 bytes starting from the register to which the address adr0 is assigned and data of 1024 bytes starting from a register to which an address adr1 is assigned are added. A result of the addition may be stored in an area of 1024 bytes starting from a register to which an address adr2 is assigned.

In the multiplication instruction mult of the instruction sequence IS2, data of 1024 bytes starting from a register, to which an address adr3 is assigned, is multiplied by data of 1024 bytes starting from a register, to which an address adr4 is assigned. A result of the multiplication may be stored in an area of 1024 bytes starting from a register to which an address adr5 is assigned.

In the instruction sequence IS2, after the data movement synchronization circuit 105 waits for the completion of the movement of the data of 1024 bytes by using the wait instruction wait, the add instruction add can be executed by using the data stored in the register. Thus, even when the addition instruction add is executed by using multiple data read from the external memory 200 having inconstant read latency, the processor 100 can be operated without false operations.

In the instruction sequence IS3, the add instruction add is executed using data moved from the shared memory 107 to the register r0. Detailed description of the same processing as that of the instruction sequence IS1 is omitted. The instruction sequence IS3 is the same as the instruction sequence IS1 except that the data is moved from the shared memory 107 to the register r0 by the data movement instruction mv.

Although the access latency of the shared memory 107 is constant, there is a case where the access of the shared memory 107 may be made to wait when the access of the shared memory 107 conflicts with the access of the external memory 200. Thus, also in the case of performing a read access to the shared memory 107 having a constant access latency, the wait instruction wait may be inserted between the data movement instruction my and the arithmetic instruction (in this example, the addition instruction add) using the data moved by the data movement instruction mv.

This allows the processor 100 to operate without false operations also in the case where the addition instruction add is executed using the data stored in the register r0 after the movement of the data, by the data movement instruction mv, from the shared memory 107 to the register r0 is completed.

In the instruction sequence IS4, the add instruction add is executed using data of 1024 bytes moved from the shared memory 107 to the register file 112. Detailed description of the same processing as that of the instruction sequence IS2 is omitted. The instruction sequence IS4 is the same as the instruction sequence IS2 except that data is moved from the shared memory 107 to a register by the data movement instruction mv. In the instruction sequence IS4, even when the read access of the shared memory 107 is made to wait due to the access of the external memory 200, the processor 100 can be operated without false operations.

In the instruction sequence IS5, after data is saved from the register r2 to the shared memory 107, the addition instruction add to store a result of the addition in the register r2 is executed. Detailed description of the same processing as that of the instruction sequence IS1 is omitted. The instruction sequence IS5 is the same as the instruction sequence IS1 except that the data is moved from the register r2 to the shared memory 107 by the data movement instruction mv.

When the data movement instruction my in the instruction sequence IS5 conflicts with the access to the external memory 200, the access to the shared memory 107 may be made to wait. Thus, even when the write access is performed to the shared memory 107 having a constant memory access time, the wait instruction "wait" may be inserted between the data movement instruction my and the arithmetic instruction (in this example, the addition instruction add) to store the operation result in the register for saving the data.

This can prevent the data to be saved from being destroyed, when the addition instruction add to store the result of the addition in the register r2, in which the data is to be saved, is executed after the saving of the data, by the data movement instruction mv, from the register r2 to the shared memory 107 is completed. As a result, the processor 100 can be operated without false operations.

In the instruction sequence IS6, after the data of 1024 bytes is saved from the register to the shared memory 107, the addition instruction add for storing the result of the addition in the register in which the data is saved is executed. Detailed description of the same processing as that of the instruction sequences IS2 and IS5 is omitted. The instruction sequence IS6 is the same as the instruction sequence IS2 except that multiple data are moved from the register to the shared memory 107 by the data movement instruction mv.

In the instruction sequence IS6, when the addition instruction add for storing the result of the addition in the register in which the data is saved is executed after the saving of the multiple data, by the data movement instruction mv, from the register to the shared memory 107 is completed, the data to be saved can be prevented from being destroyed. As a result, the processor 100 can be operated without false operations.

Here, the instruction sequence IS5 and the instruction sequence IS6 may include the data movement instruction to save the data from the register to the external memory 200 instead of the data movement instruction my to save the data from the register to the shared memory 107. Also in this case, the data movement instruction my and the addition instruction add can be synchronized with each other, and the data to be saved can be prevented from being destroyed.

In the instruction sequence IS7 of FIG. 4, the multiplication instruction mult and the data movement instruction my (tag#02) are inserted between the data movement instruction my (tag#01) and the wait instruction wait (tag#01) of the instruction sequence IS5 of FIG. 3. Additionally, the wait instruction wait (tag#02) and the addition instruction add are added after the multiplication instruction mult on the sixth line. Detailed description of the same processing as that of the instruction sequence IS5 is omitted.

There is no data dependency between the register r2 to which data is moved by the data movement instruction my (tag#01) on the first line and the registers r3, r4, and r5 used by the multiplication instruction mult on the second line. Additionally, there is no data dependency between the register r2 to which data is moved by the data movement instruction my (tag#01) on the first line and the register r3 to which data is moved by the data movement instruction my (tag#02) on the third line.

In the multiplication instruction mult on the second line, the data held in the register r3 is multiplied by the data held in the register r4, and a result of the multiplication is stored in the register r5. In the data movement instruction my (tag#02) on the third line, the data held in the register r3 is moved to the storage area of the shared memory 107 to which the address adr1 is assigned.

Here, the operations of the processor 100 according to the data movement instruction my (tag#02) on the third line, the wait instruction wait (tag#02) on the seventh line, and the addition instruction add on the eighth line may be executed in substantially the same manner as the operation of the instruction sequence IS5 in FIG. 3. Additionally, another wait instruction wait and an arithmetic instruction ex having no data dependency can be inserted between the data movement instruction my (tag#02) and the wait instruction wait (tag#02).

As described above, one or more of the arithmetic instruction ex having no data dependency with data to be moved by the data movement instruction my of interest, another data movement instruction mv, and another wait instruction wait can be inserted between the data movement instruction my of interest and the wait instruction wait. This can improve the data movement efficiency and the execution efficiency of the arithmetic instruction ex while preventing the data to be saved from being destroyed, thereby improving the processing performance of the processor 100.

In the instruction sequence IS8, the multiplication instruction mult and the data movement instruction my ("tag#"=02) to move data of 1024 bytes from the register to the shared memory 107 are inserted between the data movement instruction my (tag#01) and the wait instruction wait (tag#01) in the instruction sequence IS6 of FIG. 3. Additionally, the wait instruction wait (tag#02) and the addition instruction add are added after the multiplication instruction mult on the sixth line. Detailed description of the same processing as that of the instruction sequences IS6 and IS7 is omitted.

There is no data dependency between the register to which data is moved by the data movement instruction my (tag#01) on the first line and the register used by the multiplication instruction mult on the second line. Additionally, there is no data dependency between the register to which data is moved by the data movement instruction my (tag#01) on the first line and the register to which data is moved by the data movement instruction my (tag#02) on the third line.

In the multiplication instruction mult on the second line, data of 1024 bytes starting from the register to which the address adr3 is assigned is multiplied by data of 1024 bytes starting from the register to which the address adr4 is assigned. A result of the multiplication is stored in an area of 1024 bytes starting from the register to which the address adr5 is assigned. In the data movement instruction my (tag#02) on the third line, data of 1024 bytes starting from the register, to which the address adr3 is assigned, is moved to a storage area starting from the address adr2 in the shared memory 107.

Here, the operations of the processor 100 according to the data movement instruction my (tag#02) on the third line, the wait instruction wait (tag#02) on the seventh line, and the addition instruction add on the eighth line may be executed in substantially the same manner as the operations of the instruction sequence IS6 in FIG. 3. Additionally, another wait instruction wait and an arithmetic instruction ex having no data dependency can be inserted between the data movement instruction my (tag#02) and the wait instruction wait (tag#02).

As described, also in the instruction sequence IS8, one or more of the arithmetic instruction ex having no data dependency with the data to be moved by the data movement instruction my of interest, another data movement instruction mv, and another wait instruction wait can be inserted between the data movement instruction my of interest and the wait instruction wait. This can improve the data movement efficiency and the execution efficiency of the arithmetic instruction ex while preventing the data to be saved from being destroyed, thereby improving the processing performance of the processor 100.

In the instruction sequence IS9, data held in the register r2 is moved, via the shared memory 107, to the storage area of the external memory 200 to which the address adr0 is assigned. For example, in the instruction sequence IS9, in synchronization with the completion of the data movement instruction my (tag#01) to move the data from the register r2 to the shared memory 107, the data movement instruction my to move the moved data from the shared memory 107 to the external memory 200 is executed.

The data movement instruction my (tag#01) and the wait instruction wait (tag#01) are the same as the data movement instruction my (tag#01) and the wait instruction wait (tag#01) of the instruction sequence IS5 in FIG. 3.

Here, the data held in the register r2 may be moved to the external memory 200 via the local memory 113 instead of the shared memory 107. Alternatively, the data may be moved from the external memory 200 to the shared memory 107 by the first data movement instruction mv, and the data may be moved from the shared memory 107 to the register r2 by the third data movement instruction mv. The data may be moved from the external memory 200 to the local memory 113 by the first data movement instruction mv, and the data may be moved from the local memory 113 to the register r2 by the third data movement instruction mv.

As described, when there is data dependency between the two data movement instructions my and the external memory 200 or the like having an inconstant access latency is included in a data movement source or a data movement destination, the data movements by the two data movement instructions my can be synchronized by inserting the wait instruction wait.

Furthermore, the data may be moved from the register r2 to the local memory 113 by the data movement instruction my (tag#01) on the first line, and the data is moved from the local memory 113 to the shared memory 107 by the data movement instruction my on the third line. Additionally, the data may be moved from the shared memory 107 to the local memory 113 by the data movement instruction my (tag#01) on the first line, and the data may be moved from the local memory 113 to the register r2 by the data movement instruction my on the third line. This can move the data without causing the processor 100 to perform false operations, even when the data is moved to the external memory 200 in the background.

In the instruction sequence IS10, data of 1024 bytes starting from the register to which the address adr2 is assigned is moved, via the shared memory 107, to the storage area starting the address adr0 in the external memory 200. For example, in the instruction sequence IS10, in synchronization with the completion of the data movement instruction my (tag#01) to move the data of 1024 bytes starting from the register, to which the address adr2 is assigned, to the shared memory 107, the data movement instruction my to move the moved data from the shared memory 107 to the external memory 200 is executed.

The data movement instruction my (tag#01) and the wait instruction wait (tag#01) are the same as the data movement instruction my (tag#01) and the wait instruction wait (tag#01) of the instruction sequence IS6 in FIG. 3.

Here, the data may be moved from the external memory 200 to the shared memory 107 by the first data movement instruction mv, and may be moved from the shared memory 107 to the register r2 by the third data movement instruction mv. Additionally, as in the description of the instruction sequence IS9, the data may be moved between the register, the local memory 113, and the external memory 200, or between the register, the local memory 113, and the shared memory 107.

Also in the instruction sequence IS10, when there is data dependency between the two data movement instructions my and the external memory 200 or the like having inconstant access latency is included in a data movement source or a data movement destination, the data movements by the two data movement instructions my can be synchronized by inserting the wait instruction wait. Alternatively, when there is data dependency between the two data movement instructions my and there is a possibility of being affected by the data movement to the external memory 200 in the background, the data movements by the two data movement instructions my can be synchronized by inserting the wait instruction wait.

The instruction sequence IS11 is the same as the instruction sequence IS3 except that the addition instruction add is inserted between the data movement instruction my (tag#01) and the wait instruction wait (tag#01) of the instruction sequence IS3 in FIG. 3. For example, when the minimum number of cycles required until the data movement from the shared memory 107 to the register r0 is started by the data movement instruction my (tag#01) is known, before the minimum number of cycles elapse, an operation can be executed by using the register r0 before data is stored in the register r0.

This can execute the data movement instruction my (tag#01) to move new data to the register r0, before the addition instruction add to use data that is held in the register r0 before the new data is moved. Here, the minimum number of cycles required until the data is moved can be determined by the architecture of the processor 100 and the system including the processor 100.

In the instruction sequence IS11, the instruction distribution circuit 103 supplies the data movement instruction my (tag#01) to the NoC 104, and then supplies the addition instruction add described before the wait instruction wait (tag#01) to the arithmetic unit 111. The arithmetic unit 111 executes the addition by using the data held in the register r0 before the data is moved from the shared memory 107 to the register r0 by the data movement instruction my (tag#01).

This can perform the data movement in the background of the execution of the addition instruction add, and can conceal the latency required for the data movement while the data movement and the execution of the operation are synchronized. As a result, the processing performance of the processor 100 can be improved. Here, the data movement instruction my (tag#01) may be an instruction to move data from the external memory 200 to the register r0.

With respect to the above, in other processors, for example, the data movement instruction, such as a load instruction, to move data to the register r0 needs to be executed after the arithmetic instruction that uses data held in the register r0. This is because if the data movement instruction is executed prior to the arithmetic instruction, the data in the register used by the arithmetic instruction is overwritten and the processor performs false operations. Thus, the processing performance of other processors is lower than the processing performance of the processor 100.

The instruction sequence IS12 is the same as the instruction sequence IS4 in FIG. 3 except that the addition instruction add is inserted between the data movement instruction my (tag#01) and the wait instruction wait (tag#01) of the instruction sequence IS4. As in the instruction sequence IS11, when the minimum number of cycles required until the start of the movement of data of 1024 bytes from the shared memory 107 to the register by the data movement instruction my (tag#01) is known, the operation can be executed using the register before the data is stored in the register, before the minimum number of cycles elapse.

Also in the instruction sequence IS12, as in the instruction sequence IS11, the instruction distribution circuit 103 supplies the data movement instruction my (tag#01) to the NoC 104 and then supplies the addition instruction add described before the wait instruction wait (tag#01) to the arithmetic unit 111. Then, before the first data is stored from the shared memory 107 to the register by the data movement instruction my (tag#01), the arithmetic unit 111 performs the addition using the data held in the register in which the data is to be stored.

This can perform the movement of multiple data in the background of the execution of the addition instruction "add", and can conceal the latency required to move the multiple data while the movement of the data and the execution of the operation are synchronized with each other. As a result, the processing performance of the processor 100 can be improved. Here, the data movement instruction my (tag#01) may be an instruction to move multiple data from the external memory 200 to the register.

Here, in the instruction sequence IS illustrated in FIG. 3 and FIG. 4, the data movement instruction my for the shared memory 107 or the external memory 200 is supplied, but the data movement instruction my for the network may be supplied. That is, instead of "mem.adr0", "sm.adr0", and "sm.adr1" included in the instruction sequence IS illustrated in FIG. 3 and FIG. 4, "nw.adr0", "nw.adr0", and "nw.adr1" may be described, respectively. A symbol nw indicates a network. Also in this case, the same effect as the effect of each of the instruction sequences IS1 to IS12 described above can be obtained.

FIG. 5 is a drawing illustrating an example of synchronization control between the data movement instruction and the arithmetic instruction by other processors. In FIG. 5, a symbol ld indicates a load instruction and a symbol st indicates a store instruction.

In Example 1 of the synchronization control illustrated in FIG. 5, the core of the processor executes, for example, a load instruction ld to read out data from the storage area to which the address adr0 of the external memory is assigned to the register r0. The load instruction ld functions as the data movement instruction. Next, the core waits for the completion of the data movement by the load instruction ld by using a synchronization control circuit mounted on the core, for example. Then, the core executes the addition instruction add by using the data stored in the register r0 based on the detection of the completion of the data movement by the synchronization control circuit.

In Example 2 of the synchronization control illustrated in FIG. 5, the core executes, for example, a store instruction st to store the data held in the register, to which the address adr1 is assigned, in a register dmareg for DMA transfer, to which the address adr0 is assigned. For example, the data to be stored in the register dmareg includes a source address, a destination address, and a data transfer size of the DMA transfer.

The DMA controller mounted on the processor executes DMA transfer (i.e., the movement of the data) according to the information stored in the register dmareg, and, for example, transfers data from the external memory to the register r0. As described, the store instruction st functions as the data movement instruction to start the DMA transfer.

The DMA controller sets a register dmaend, which is not illustrated, at the completion of the DMA transfer. The core repeatedly executes the load instruction ld to poll the register dmaend as an instruction to detect the completion of the movement of the data, for example. Then, the core detects the completion of the DMA transfer by polling the setting of the register dmaend. Here, the DMA controller may issue an interrupt when the DMA transfer is completed, and the core may detect the completion of the DMA transfer based on the interrupt. Then, based on the detection of the completion of the DMA transfer, the core executes the addition instruction add by using the data stored in the register r0.

As described above, in other processors, the synchronization control between the data movement instruction and the arithmetic instruction is performed by hardware mounted on the core of the processor or software executed by the core. The data movement instruction and the arithmetic instruction are executed in different instruction sequences in accordance with the timing of data movement from the external memory having an inconstant read latency to the register r0, and are synchronized with each other by using a method, such as polling or interruption.

Additionally, such other processors may have an out-of-order instruction scheduling function, a register renaming or multithreading function, and the like. With these functions, the processing performance can be improved by reducing the number of idle cycles that occur after the data movement instruction is issued until the arithmetic instruction is executed, but the circuit scale of the core increases.

As described above, in the present embodiment, when the data is moved between the external memory 200 or the like having an inconstant access latency and the register used for the operation, the processor 100 can synchronize the movement of the data based on the data movement instruction my with the operation executed in response to the movement of the data.

In this case, the processor 100 may synchronize the execution of the data movement instruction my and the execution of the arithmetic instruction ex without using the core 110. For example, the core 110 need not perform a process of waiting for the completion of the data movement by an interruption process or the like. Therefore, the execution of the data movement instruction my for the external memory 200 or the like having an inconstant access latency and the execution of the arithmetic instruction ex can be synchronized with each other without applying a load to the core 110, and the processing performance of the operation of the processor 100 can be improved. Additionally, because it is not necessary to provide a buffer to hold data to be moved in the core 110, an increase in the circuit scale of the core 110 can be suppressed. The effect of reducing the circuit scale increases as the number of cores 110 mounted on the processor 100 increases.

The wait instruction wait is inserted between the data movement instruction my and the arithmetic instruction ex to be synchronized with each other, so that the instruction distribution circuit 103 can easily determine the arithmetic instruction ex to be prevented from being issued in order to synchronize with the completion of the data movement. Additionally, because it is not necessary to add the tag "tag#" to each of the multiple arithmetic instructions ex to be synchronized with the data movement instruction mv, the description of the instruction sequence IS can be simplified and an error in the description of the instruction sequence IS can be suppressed.

As indicated in the instruction sequences IS7, IS8, IS11, and IS12, the processor 100 can execute an arithmetic instruction having no data dependency inserted between the data movement instruction my and the wait instruction wait without the execution of the arithmetic instruction being prevented. This can execute the arithmetic instruction ex that is not a synchronization target, before the data movement by the data movement instruction my is completed.

As a result, the arithmetic execution efficiency of the arithmetic unit 111 can be improved, so that the processing performance of the processor 100 can be improved. In this case, the processor 100 can improve the processing performance of the operation without having an instruction scheduling function, a register renaming function, a multithreading function, or the like. In other words, the processing performance of the operation can be improved without increasing the circuit scale of the core 110.

The common tag "tag#" is added to the data movement instruction my and the wait instruction wait, the instruction distribution circuit 103 can easily determine that the data movement instruction my and the arithmetic instruction ex following the wait instruction wait are to be synchronized. For example, as indicated in the instruction sequences IS7 and IS8, when another data movement instruction my is described between the data movement instruction my and the arithmetic instruction ex to be synchronized, the instruction distribution circuit 103 can easily determine the data movement instruction my and the arithmetic instruction ex to be synchronized.

As indicated in the instruction sequences IS11 and IS12, the processor 100 can execute the arithmetic instruction ex, by using the register to which new data is not moved yet, before the new data movement is started by the data movement instruction mv. This allows the data movement to be executed in the background of the execution of the arithmetic instruction ex, and to conceal the latency required to move the data. As a result, the processing performance of the processor 100 can be improved.

Additionally, the wait instruction wait is inserted between the data movement instruction my for the shared memory 107 to be accessed by the NoC 104 and the arithmetic instruction "ex" to be synchronized with the data movement instruction mv. Thus, when the access to the shared memory 107 is made to wait due to conflict with the access to the external memory 200, the data movement instruction my for the shared memory 107 and the arithmetic instruction ex can be synchronized with each other.

As indicated in the instruction sequences IS2, IS4, IS6, IS8, IS10, and IS12, the movement amount information len indicating the movement amount of the data is added to the data movement instruction mv, so that the processor 100 can synchronize the execution of the data movement instruction my with the execution of the arithmetic instruction ex even when a large amount of data is moved.

Figure 6:
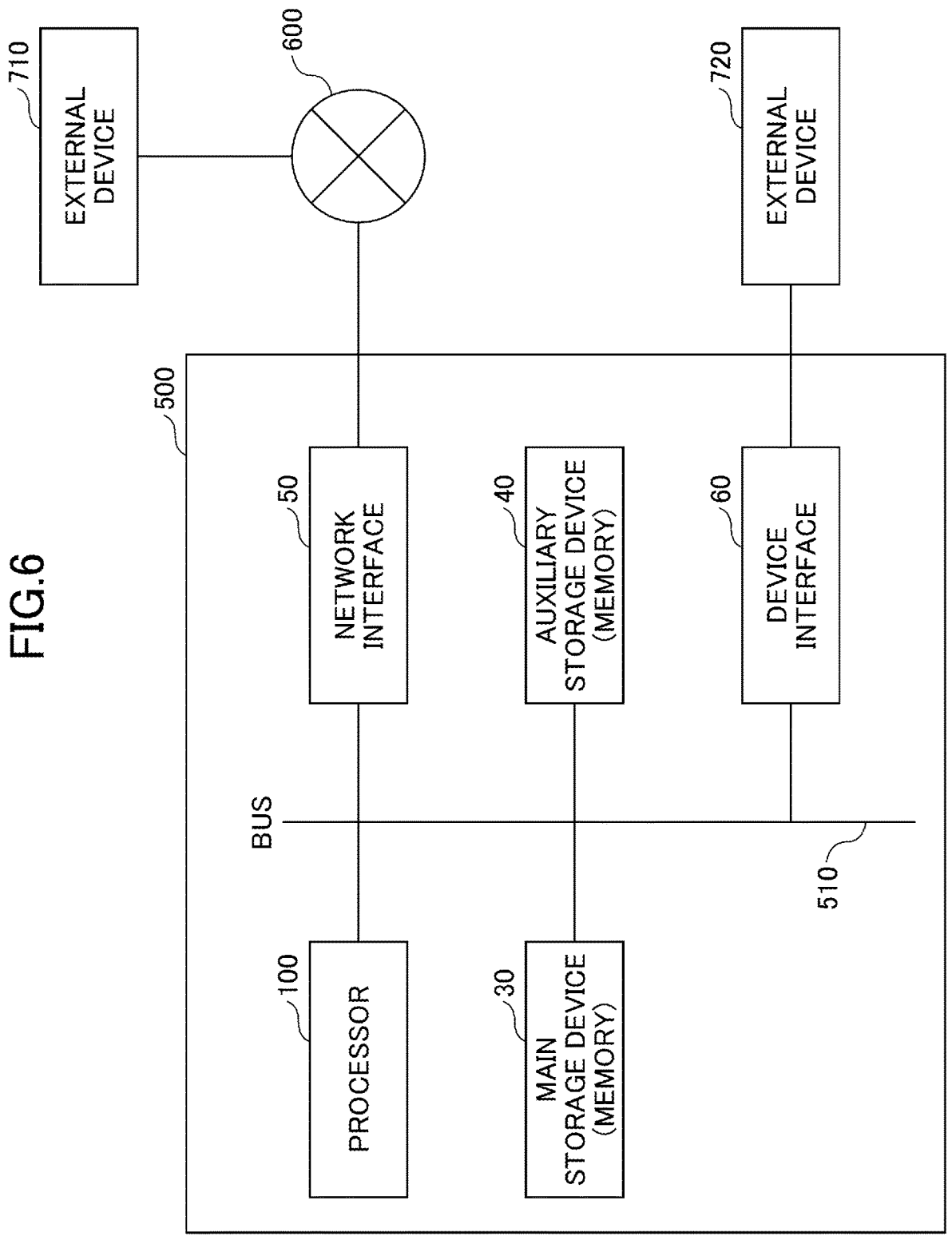
FIG. 6 is a block diagram illustrating an example of a hardware configuration of a computer on which the processor illustrated in FIG. 1 is mounted.

FIG. 6 is a block diagram illustrating an example of a hardware configuration of a computer on which the processor 100 illustrated in FIG. 1 is mounted. In FIG. 6, as an example, the computer may be realized as a computer 500 including the processor 100, a main storage device 30 (a memory), an auxiliary storage device 40 (a memory), a network interface 50, and a device interface 60, which are connected to each other via a bus 510. For example, the main storage device 30 may be the external memory 200 illustrated in FIG. 1.

The computer 500 of FIG. 6 includes one of each component, but may include two or more of the same components. Additionally, although one computer 500 is illustrated in FIG. 6, software may be installed in multiple computers, and each of the multiple computers may execute the same part or different parts of the processing of the software. In this case, a form of distributed computing in which the computers communicate with each other via the network interface 50 or the like to perform the processing may be employed. That is, a system may be configured to implement functions by one or more computers 500 executing instructions stored in one or more storage devices. Additionally, the information transmitted from a terminal may be processed by one or more computers 500 provided on a cloud, and the processing result may be transmitted to the terminal.

Various operations may be executed in parallel processing using one or more processors 100 mounted on the computer 500 or using multiple computers 500 via a network. Additionally, various operations may be distributed to multiple arithmetic cores in the processor 100 to be executed in parallel processing. Additionally, some or all of the processes, means, and the like of the present disclosure may be realized by at least one of a processor or a storage device provided on a cloud that can communicate with the computer 500 via a network. As described, each device in the above-described embodiments may be in a form of parallel computing by one or more computers.

The processor 100 may be an electronic circuit (a processing circuit, processing circuitry, a CPU, a GPU, an FPGA, an ASIC, or the like) that performs at least one of computer control or operations. Additionally, the processor 100 may be any of a general-purpose processor, a dedicated processing circuit designed to execute a specific operation, and a semiconductor device including both a general-purpose processor and a dedicated processing circuit. Additionally, the processor 100 may include an optical circuit or may include an arithmetic function based on quantum computing.

The processor 100 may perform arithmetic processing based on data or software input from each device or the like of the internal configuration of the computer 500, and may output an operation result or a control signal to each device or the like. The processor 100 may control respective components constituting the computer 500 by executing an operating system (OS), an application, or the like of the computer 500.

The main storage device 30 may store instructions executed by the processor 100, various data, and the like, and information stored in the main storage device 30 may be read by the processor 100. The auxiliary storage device 40 is a storage device other than the main storage device 30. Here, these storage devices indicate any electronic components capable of storing electronic information, and may be semiconductor memories. The semiconductor memory may be either a volatile memory or a nonvolatile memory. A storage device for storing various data and the like in the computer 500 may be realized by the main storage device 30 or the auxiliary storage device 40, or may be realized by a built-in memory built in the processor 100.

When the computer 500 includes at least one storage device (memory) and at least one processor 100 connected (coupled) to the at least one storage device, the at least one processor 100 may be connected to one storage device. Additionally, at least one storage device may be connected to one processor 100. Additionally, a configuration in which at least one processor 100 among the multiple processors 100 is connected to at least one storage device among the multiple storage devices may be included. Additionally, this configuration may be realized by storage devices and the processors 100 included in multiple computers 500. Furthermore, a configuration in which the storage device is integrated with the processor 100 (for example, an L1 cache or a cache memory including an L2 cache) may be included.

The network interface 50 is an interface for connecting to a communication network 600 by wire or wirelessly. As the network interface 50, an appropriate interface, such as one conforming to an existing communication standard, may be used. The network interface 50 may exchange information with an external device 710 connected via the communication network 600. Here, the communication network 600 may be any one of a wide area network (WAN), a local area network (LAN), a personal area network (PAN), and the like, or a combination thereof, as long as information is exchanged between the computer 500 and the external device 710. Examples of the WAN include the Internet and the like, and examples of the LAN include IEEE802.11, Ethernet (registered trademark), and the like. Examples of the PAN include Bluetooth (registered trademark), Near Field Communication (NFC), and the like.

The device interface 60 is an interface, such as a USB, that is directly connected to an external device 720.

The external device 710 is a device connected to the computer 500 via a network. The external device 720 is a device directly connected to the computer 500.

The external device 710 or the external device 720 may be, for example, an input device. The input device is, for example, a device, such as a camera, a microphone, a motion capture device, various sensors, a keyboard, a mouse, a touch panel, or the like, and gives acquired information to the computer 500. Alternatively, the device may be a device including an input unit, a memory, and a processor, such as a personal computer, a tablet terminal, or a smartphone.

Additionally, the external device 710 or the external device 720 may be, for example, an output device. The output device may be, for example, a display device, such as a liquid crystal display (LCD) or an organic electro luminescence (EL) panel, or may be a speaker that outputs sound or the like. Alternatively, the device may be a device including an output unit, a memory, and a processor, such as a personal computer, a tablet terminal, or a smartphone.

Additionally, the external device 710 or the external device 720 may be a storage device (a memory). For example, the external device 710 may be a network storage or the like, and the external device 720 may be a storage, such as an HDD.

Additionally, the external device 710 or the external device 720 may be a device having some functions of the components of the computer 500. That is, the computer 500 may transmit a part or all of the processing result to the external device 710 or the external device 720, or may receive a part or all of the processing result from the external device 710 or the external device 720.

In the present specification (including the claims), if the expression "at least one of a, b, and c" or "at least one of a, b, or c" is used (including similar expressions), any one of a, b, c, a-b, a-c, b-c, or a-b-c is included. Multiple instances may also be included in any of the elements, such as a-a, a-b-b, and a-a-b-b-c-c. Further, the addition of another element other than the listed elements (i.e., a, b, and c), such as adding d as a-b-c-d, is included.

In the present specification (including the claims), if the expression, such as "in response to data being input", "using data", "based on data", "according to data", or "in accordance with data" (including similar expressions), is used, unless otherwise noted, a case in which the data itself is used and a case in which data obtained by processing the data (e.g., data obtained by adding noise, normalized data, a feature amount extracted from the data, and intermediate representation of the data) is used are included. If it is described that any result can be obtained "in response to data being input", "using data", "based on data", "according to data", or "in accordance with data" (including similar expressions), unless otherwise noted, a case in which the result is obtained based on only the data is included, and a case in which the result is obtained affected by another data other than the data, factors, conditions, and/or states may be included. If it is described that "data is output" (including similar expressions), unless otherwise noted, a case in which the data itself is used as an output is included, and a case in which data obtained by processing the data in some way (e.g., data obtained by adding noise, normalized data, a feature amount extracted from the data, and intermediate representation of the data) is used as an output is included.

In the present specification (including the claims), if the terms "connected" and "coupled" are used, the terms are intended as non-limiting terms that include any of direct, indirect, electrically, communicatively, operatively, and physically connected/coupled. Such terms should be interpreted according to a context in which the terms are used, but a connected/coupled form that is not intentionally or naturally excluded should be interpreted as being included in the terms without being limited.

In the present specification (including the claims), if the expression "A configured to B" is used, a case in which a physical structure of the element A has a configuration that can perform the operation B, and a permanent or temporary setting/configuration of the element A is configured/set to actually perform the operation B may be included. For example, if the element A is a general purpose processor, the processor may have a hardware configuration that can perform the operation B and be configured to actually perform the operation B by setting a permanent or temporary program (i.e., an instruction). If the element A is a dedicated processor, a dedicated arithmetic circuit, or the like, a circuit structure of the processor may be implemented so as to actually perform the operation B irrespective of whether the control instruction and the data are actually attached.

In the present specification (including the claims), if a term indicating inclusion or possession (e.g., "comprising", "including", or "having") is used, the term is intended as an open-ended term, including inclusion or possession of an object other than a target object indicated by the object of the term. If the object of the term indicating inclusion or possession is an expression that does not specify a quantity or that suggests a singular number (i.e., an expression using "a" or "an" as an article), the expression should be interpreted as being not limited to a specified number.

In the present specification (including the claims), even if an expression, such as "one or more" or "at least one", is used in a certain description, and an expression that does not specify a quantity or that suggests a singular number (i.e., an expression using "a" or "an" as an article) is used in another description, it is not intended that the latter expression indicates "one". Generally, an expression that does not specify a quantity or that suggests a singular number (i.e., an expression using "a" or "an" as an article) should be interpreted as being not necessarily limited to a particular number.

In the present specification, if it is described that a particular advantage/result is obtained in a particular configuration included in an embodiment, unless there is a particular reason, it should be understood that that the advantage/result may be obtained in another embodiment or other embodiments including the configuration. It should be understood, however, that the presence or absence of the advantage/result generally depends on various factors, conditions, and/or states, and that the advantage/result is not necessarily obtained by the configuration. The advantage/result is merely an advantage/result that is obtained by the configuration described in the embodiment when various factors, conditions, and/or states are satisfied, and is not necessarily obtained in the invention according to the claim that defines the configuration or a similar configuration.

In the present specification (including the claims), if multiple hardware performs predetermined processes, each of the hardware may cooperate to perform the predetermined processes, or some of the hardware may perform all of the predetermined processes. Additionally, some of the hardware may perform some of the predetermined processes while other hardware may perform the remainder of the predetermined processes. In the present specification (including the claims), if an expression, such as "one or more hardware perform a first process and the one or more hardware perform a second process", is used, the hardware that performs the first process may be the same as or different from the hardware that performs the second process. That is, the hardware that performs the first process and the hardware that performs the second process may be included in the one or more hardware. The hardware may include an electronic circuit, a device including an electronic circuit, or the like.

In the present specification (including the claims), if multiple storage devices (memories) store data, each of the multiple storage devices (memories) may store only a portion of the data or may store an entirety of the data. Additionally, a configuration in which some of the multiple storage devices store data may be included.

Although the embodiments of the present disclosure have been described in detail above, the present disclosure is not limited to the individual embodiments described above. Various additions, modifications, substitutions, partial deletions, and the like can be made without departing from the conceptual idea and spirit of the invention derived from the contents defined in the claims and the equivalents thereof. For example, in the embodiments described above, if numerical values or mathematical expressions are used for description, they are presented as an example and do not limit the scope of the present disclosure. Additionally, the order of respective operations in the embodiments is presented as an example and does not limit the scope of the present disclosure.

What is claimed is:

1. A system comprising:
a first processor having a plurality of first cores;
a second processor having a plurality of second cores;
an external memory shared by the first processor and the second processor;
a first arithmetic circuit formed in a core of the plurality of first cores and configured to execute a first arithmetic instruction;
a second arithmetic circuit formed in a core of the plurality of second cores and configured to execute a second arithmetic instruction;
a first register configured to hold first data used by the first arithmetic circuit; and
a second register configured to hold second data used by the second arithmetic circuit,
wherein the first processor receives a first data movement instruction and the first arithmetic instruction corresponding to the first data movement instruction, and moves the first data from the external memory to the first register based on the first data movement instruction,
wherein the second processor receives a second data movement instruction and the second arithmetic instruction corresponding to the second data movement instruction, and moves the second data from the external memory to the second register based on the second data movement instruction, wherein the first arithmetic circuit executes the first arithmetic instruction after a data movement of the first data movement instruction is completed, wherein the second arithmetic circuit executes the second arithmetic instruction after a data movement of the second data movement instruction is completed; and wherein the first processor and the second processor are GPU and both operate using single instruction multiple threads (SIMT).

2. The system as claimed in claim 1, wherein a first instruction sequence received by the first processor includes the first data movement instruction, a first wait instruction, and the first arithmetic instruction that correspond to one another, and wherein the first processor prevents the first arithmetic instruction subsequent to the first wait instruction from being input to the first arithmetic circuit until a corresponding completion information of the first data movement instruction is input.

3. The system as claimed in claim 2, wherein the first processor inputs a third arithmetic instruction between the first data movement instruction and the first wait instruction to the first arithmetic circuit without preventing the third arithmetic instruction.

4. The system as claimed in claim 2, wherein the first data movement instruction and the first wait instruction include identification information for associating the first data movement instruction with the first wait instruction.

5. The system as claimed in claim 1, further comprising a memory having a constant access latency, wherein an access latency of the external memory is not constant, and wherein the first processor controls movement of the first data for the external memory or the memory based on the first data movement instruction, and wherein the first data movement instruction is any one of an instruction to move the first data between the external memory and the first register, an instruction to move the first data between the memory and the first register, and an instruction to move the first data between the external memory and the memory.

6. The system as claimed in claim 1, further comprising a first board having the first processor mounted thereon; and a second board having the second processor mounted thereon, wherein the first board is separate from the second board.

7. The system as claimed in claim 1, wherein the first data movement instruction includes movement amount information indicating a movement amount of the first data.

8. The system as claimed in claim 1, wherein the first processor inputs permission information for permitting an input of the first arithmetic instruction corresponding to the completion of the data movement of the first data movement instruction based on reception of the completion information, and wherein the first processor inputs the first arithmetic instruction corresponding to the permission information to the first arithmetic circuit based on reception of the permission information.

9. The system as claimed in claim 1, the first processor further comprising:

a data movement control circuit configured to move the first data from the external memory to the first register based on the first data movement instruction; and an instruction distribution circuit configured to receive the first data movement instruction and the first arithmetic instruction corresponding to the first data movement instruction, output the first data movement instruction, and output the first arithmetic instruction to the first arithmetic circuit after the data movement of the first data movement instruction is completed.

10. The system as claimed in claim 9, wherein the first processor and the second processor both execute the same instructions.

11. A method of controlling a system including:

a first processor having a plurality of first cores;

a second processor having a plurality of second cores;

an external memory shared by the first processor and the second processor;

a first arithmetic circuit formed in a core of the plurality of first cores and configured to execute a first arithmetic instruction;

a second arithmetic circuit formed in a core of the plurality of second cores and configured to execute a second arithmetic instruction;

a first register configured to hold first data used by the first arithmetic circuit; and a second register configured to hold second data used by the second arithmetic circuit, the method comprising:

receiving, by the first processor, a first data movement instruction and the first arithmetic instruction corresponding to the first data movement instruction, and moving, by the first processor, the first data from the external memory to the first register based on the first data movement instruction;

receiving, by the second processor, a second data movement instruction and the second arithmetic instruction corresponding to the second data movement instruction, moving, by the second processor, the second data from the external memory to the second register based on the second data movement instruction;

executing, by the first arithmetic circuit, the first arithmetic instruction after a data movement of the first data movement instruction is completed; and executing, by the second arithmetic circuit, the second arithmetic instruction after a data movement of the second data movement instruction is completed, wherein the first processor and the second processor are GPU and both operate using single instruction multiple threads (SIMT).

12. The method of controlling the system as claimed in claim 11, wherein a first instruction sequence received by the first processor includes the first data movement instruction, a first wait instruction, and the first arithmetic instruction that correspond to one another, and further comprising:

preventing, by the first processor, the first arithmetic instruction subsequent to the first wait instruction from being input to the first arithmetic circuit until a corresponding completion information of the first data movement instruction is input.

13. The method of controlling the system as claimed in claim 12, wherein the first processor inputs a third arithmetic instruction between the first data movement instruction and the first wait instruction to the first arithmetic circuit without preventing the third arithmetic instruction.

14. The method of controlling the system as claimed in claim 12, wherein the first data movement instruction and the first wait instruction include identification information for associating the first data movement instruction with the first wait instruction.

15. The method of controlling the system as claimed in claim 11, further comprising a memory configured to have a constant access latency, wherein an access latency of the external memory is not constant, wherein the first processor controls movement of the first data for the external memory or the memory based on the first data movement instruction, and wherein the first data movement instruction is any one of an instruction to move the first data between the external memory and the first register, an instruction to move the first data between the memory and the first register, and an instruction to move the first data between the external memory and the memory.

16. The method of controlling the system as claimed in claim 11, further comprising a first board having the first processor mounted thereon; and a second board having the second processor mounted thereon, wherein the first board is separate from the second board.

17. The method of controlling the system as claimed in claim 11, wherein the first data movement instruction includes movement amount information indicating a movement amount of the first data.

18. The method of controlling the system as claimed in claim 11, wherein the first processor inputs permission information for permitting an input of the first arithmetic instruction corresponding to the completion of the data movement of the first data movement instruction based on reception of the completion information, and wherein the first processor inputs the first arithmetic instruction corresponding to the permission information to the first arithmetic circuit based on reception of the permission information.

19. The method of controlling the system as claimed in claim 11, further comprising:

moving, by a data movement control circuit of the first processor, the first data from the external memory to the first register based on the first data movement instruction; and receiving, by an instruction distribution circuit of the first processor, the first data movement instruction and the first arithmetic instruction corresponding to the first data movement instruction, outputting, by the instruction distribution circuit, the first data movement instruction, and outputting, by the instruction distribution circuit, the first arithmetic instruction to the first arithmetic circuit after the data movement of the first data movement instruction is completed.

20. The method of controlling the system as claimed in claim 19, wherein the first processor and the second processor both execute the same instructions.

* * * * *